United States Patent
Lee et al.

(10) Patent No.: US 7,991,403 B2
(45) Date of Patent: Aug. 2, 2011

(54) LOAD BALANCING METHOD FOR WIRELESS NETWORK SYSTEM

(75) Inventors: Shih Ching Lee, Taipei (TW); Pei Chuan Liu, Taipei (TW)

(73) Assignee: Cameo Communication (TW)

( * ) Notice: Subject to any disclaimer, the term of this patent is extended or adjusted under 35 U.S.C. 154(b) by 1004 days.

(21) Appl. No.: 11/798,322

(22) Filed: May 11, 2007

(65) Prior Publication Data
US 2008/0123529 A1    May 29, 2008

(30) Foreign Application Priority Data
Nov. 23, 2006   (TW) ............................... 95143399 A

(51) Int. Cl.
*H04W 72/00*    (2009.01)
(52) U.S. Cl. ........................................ 455/453; 370/237
(58) Field of Classification Search .................. 455/450, 455/453; 370/338
See application file for complete search history.

(56) References Cited

U.S. PATENT DOCUMENTS

| | | | | |
|---|---|---|---|---|
| 7,162,250 B2* | 1/2007 | Misra | ........................... | 455/453 |
| 7,222,175 B2* | 5/2007 | Knauerhase et al. | ......... | 709/225 |
| 7,675,890 B2* | 3/2010 | Wang | ........................... | 370/338 |
| 2003/0134642 A1* | 7/2003 | Kostic et al. | .................. | 455/450 |
| 2005/0053046 A1* | 3/2005 | Wang | ........................... | 370/338 |
| 2005/0208950 A1* | 9/2005 | Hasse | .......................... | 455/453 |

* cited by examiner

*Primary Examiner* — Lester Kincaid
*Assistant Examiner* — Isaak R Jama

(57) ABSTRACT

A method for providing load balance to a wireless network system is disclosed, wherein a network management server (NMS) is used to group a plurality of access points into a plurality of groups. Each of the access points is pre-set with a plurality of water level values corresponding to an acceptable load thereof, and each of the water level values is pre-set with a corresponding trap up value. Only when the real-time load of one of the access points is up to the trap up value thereof, the access point actively sends a signal of a corresponding load status thereof to the NMS. Meanwhile, the NMS checks the water level values of the other access points belonged to the same group of the access point. If all of the water level values of the other access points belonged to the same group of the access point are not less than the water level value of the access point, the water level value of the access point which has the real-time load up to the trap up value thereof is upgraded once so as to allow the access point to keep a higher acceptable load. Thus, it is unnecessary for each of the access points to continuously broadcast its corresponding load status so as to prevent from occupying the bandwidth thereof and thus to improve the overall efficiency of the wireless network system.

11 Claims, 5 Drawing Sheets

| Water level value | Up limit value | Trap up value | Low limit value |
|---|---|---|---|
| level 1 | 20 | 15 | 0 |
| level 2 | 30 | 25 | 10 |
| level 3 | 40 | 35 | 20 |
| level 4 | 50 | 45 | 30 |
| level 5 | 60 | 55 | 40 |

FIG. 3

LOAD BALANCING METHOD FOR WIRELESS NETWORK SYSTEM

BACKGROUND OF INVENTION

1. Field of the Invention

The present invention relates to a load balancing method for wireless network system, and more particularly to a method applied to a Wireless Local Access Network (WLAN) system for adjusting an acceptable load of each of access points (APs) via a Network Management Server (NMS) for providing load balance.

2. Description of the Prior Art

Presently, due to human life has more and more needs to the portability of electronic information apparatus and the real-time transmission of electronic information, various wireless communication functions have become one of requisites when a user wants to buy an electronic information apparatus.

Traditionally, a communication system of Wireless Local Access Network (WLAN) is provided to integrate radio frequency (RF) technologies with network technologies, so that it is unnecessary for users to access any Internet information via any physical network cables, but the users can access the Internet information by connecting other network devices via the WLAN. Even though the communication system of the WLAN can be used to provide the accessing convenience, it still exists a disadvantage that the communication system thereof is not provided with any physical network cables to connect each of Access Points (APs) which provide transmission services of wireless information with each of terminal devices of the users. Thus, it is an important issue for related manufacturers to think how to stably control and allocate wireless data flows (i.e. load) between each of the APs and each of the terminal devices for improving the overall efficiency of the communication system of the WLAN.

Nowadays, a conventional load balance technology of a wireless network system principally works based on each of the APs continuously broadcasts a corresponding load status thereof to the other of the APs, and then a predetermined one of the APs (or Network Management Server, i.e. NMS) is assigned to determine if the load status of each of the APs is set into an over load status, a load balance status, or an under load status, followed by determining if each of the APs can process more connection requests of terminal devices or more information transmission requests thereof. Any one of the APs which is set in the over load status will be not used to process any new connection requests of the terminal devices or any new information transmission requests thereof. Meanwhile, the terminal devices will send the connection requests to one of the other APs, so as to prevent the over-loaded AP from processing too much load in a short time and lowering the transmission efficiency thereof. The conventional load balance technology as described above can be used to provide a load balance effect, but each of the APs must continuously broadcast the corresponding load status to the other of the APs resulting in occupying the bandwidth of each of the APs and unavoidably lowering the overall efficiency of the wireless network system.

It is therefore tried by the inventor to develop a wireless network system for providing load balance and a method for providing load balance to the wireless network system, to solve the problems existing in the conventional load balance technology, as described above.

SUMMARY OF INVENTION

A primary object of the present invention is to provide a wireless network system for providing load balance and a method for providing load balance to the wireless network system, which is used to monitor and adjust an acceptable load of each of access points (APs) via a Network Management Server (NMS) for the purpose of providing load balance.

A secondary object of the present invention is to provide a wireless network system for providing load balance and a method for providing load balance to the wireless network system, which is used to group all of APs into a plurality of groups, and then monitor a load status of all of the APs in one of the groups for providing load balance, so as to increase the control efficiency and enhance the network transmission efficiency.

A third object of the present invention is to provide a method for providing load balance to a wireless network system, wherein only when a real-time load of one of APs is up to a trap up value, said AP actively sends a signal of a corresponding load status thereof to a NMS; and only when the NMS receives the signal representing that the load status of said AP is up to the trap up value, the NMS monitors a load status of the other of the APs, so that it is unnecessary for each of the APs to continuously broadcast its corresponding load status so as to prevent from occupying the bandwidth thereof and thus to improve the overall efficiency of the wireless network system.

In order to achieve the aforementioned objects, one embodiment of the method for providing load balance to a wireless network system in accordance with the present invention is disclosed. The system is provided with at least one terminal device, a plurality of access points, and a network management server (NMS). The method comprises:

grouping the access points into at least one group by the NMS, while pre-setting at least one water level value corresponding to an acceptable load of each of the access points, wherein each of the water level value is pre-set with a corresponding trap up value;

when a real-time load of one of the access points being not less than the trap up value of said access point, checking the water level values of the other access points belonged to the same group of said access point via the NMS; and if all of the water level values of the other access points being not less than the water level value of said access point, upgrading the water level value of said access point once, so that said access point is allowed to keep a higher acceptable load.

In a preferred embodiment, the NMS further comprises:

a wireless network module for connecting to each of the access points via the wireless network;

a group management module for grouping the access points into at least one group via the wireless network;

a load monitor module for monitoring a real-time load of each of the access points via the wireless network; and a water-level adjustment module for determining if a water-level adjustment signal is outputted to the access points in the same group according to the real-time load of each of the access points in the same group monitored by the load monitor module.

In a preferred embodiment, each of the access points further comprises:

a wireless network module for connecting to the NMS, the terminal device, and other access points via the wireless network;

a load level table including a plurality of water level values which are graded according to at least one acceptable load, wherein each of the water level values has an up limit value, a trap up value, and a low limit value corresponding to each of the water level values;

a load report module for transmitting the water level value corresponding to the acceptable load of the access points and the real-time load of the access points to the NMS via the wireless network; and a level switch module for receiving the water-level adjustment signal from the NMS, and switching the corresponding water level value according to the water-level adjustment signal.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3 is a load level table of the method for providing load balance to the wireless network system according to the preferred embodiment of the present invention showing load levels stored in each of Access Points (APs);

DETAILED DESCRIPTION

Figure 1:
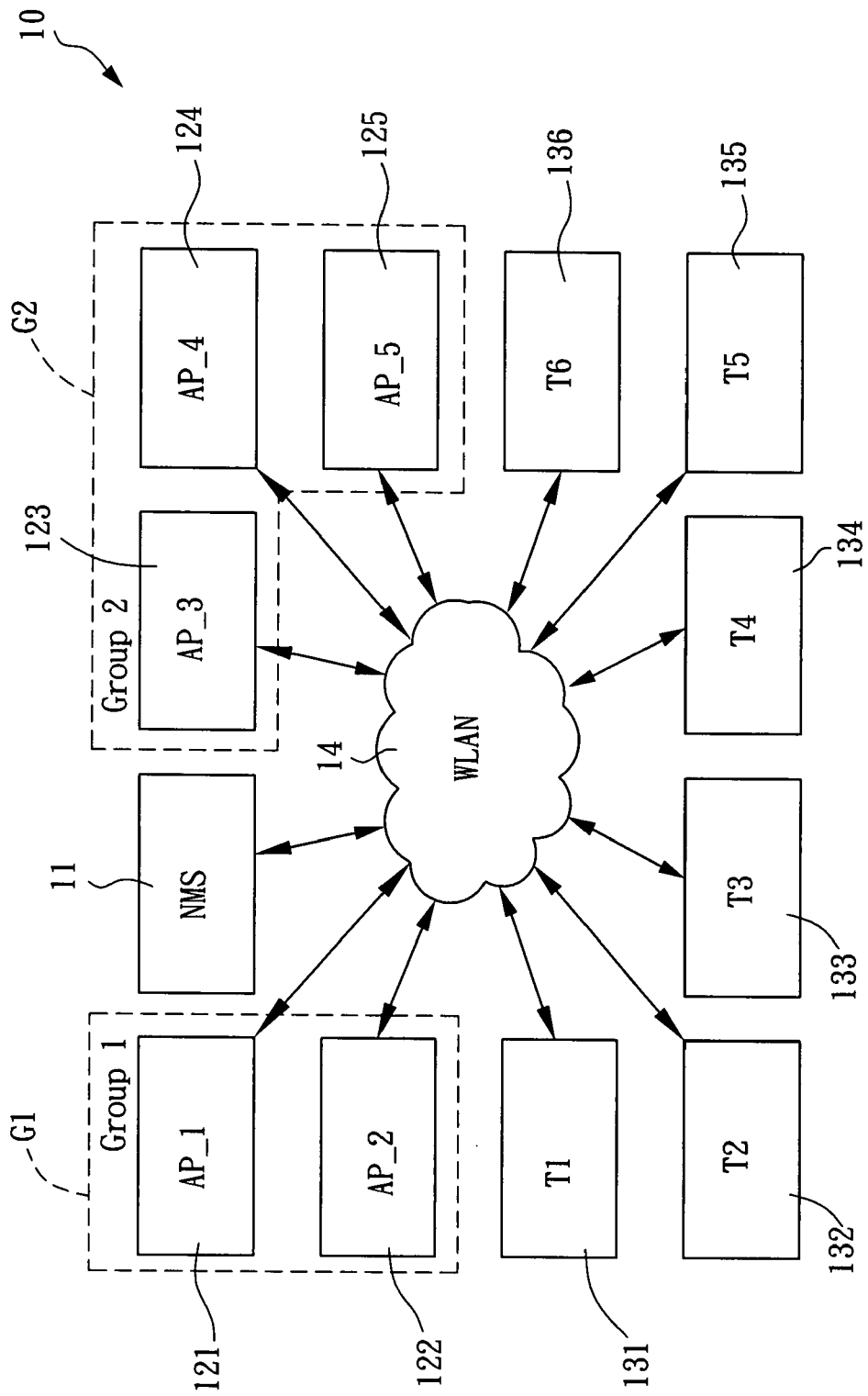
FIG. 1 is a block diagram of a wireless network system for providing load balance according to a preferred embodiment of the present invention.

Referring now to FIG. 1, a block diagram of a wireless network system 10 for providing load balance according to a preferred embodiment of the present invention is illustrated. As shown, the wireless network system 10 comprises at least one Network Management Server 11 (also called NMS hereinafter), a plurality of Access Points 121-125 (i.e. AP_1-AP_5), and a plurality of terminal devices 131-136 (i.e. T1-T6). The NMS 11, the access points 121-125, and the terminal devices 131-136 are interconnected to each other via a wireless network environment 14, such as a system selected from (but not limited to): Wireless Local Access Network (WLAN), Global System for Mobile Communication (GSM), General Packet Radio Service (GPRS), Code Division Multiple Access (CDMA), and Ultra Wide Band (UWB), and etc.

Referring still to FIG. 1, in the preferred embodiment of the present invention, the NMS 11 is selected from an independent wireless network device in a hardware form, or a wireless network device in a software form built in one of the access points 121-125 or one of the terminal devices 131-136. The NMS 11 is mainly used to group the access points 121-125 into a plurality of groups G1, G2, and etc., according to expected load levels of the access points 121-125 or locations thereof. In other words, if it can be expected that there are more users or much network transmission load in a certain area in relation to the other area, more access points (for example, 123-125) will be grouped into a predetermined group (for example, G2) for the area according to the method of the present invention. Then, the NMS 11 will monitor the load status of the access points 121-125 of each of the group G1, G2, and etc., and provide a control function of load balance. The access points 121-125 are used to receive connection requests and information transmission requests from the terminal devices 131-136, and then execute corresponding information transmissions. The terminal devices 131-136 is a device for general users to access an Internet, and can be selected from (but not limited to): computers, Personal Digital Assistants (PDAs), mobile phones or game players with a network access function, or other electronic information devices with a built-in wireless network receiver or an extended wireless network receiver.

Figure 2:
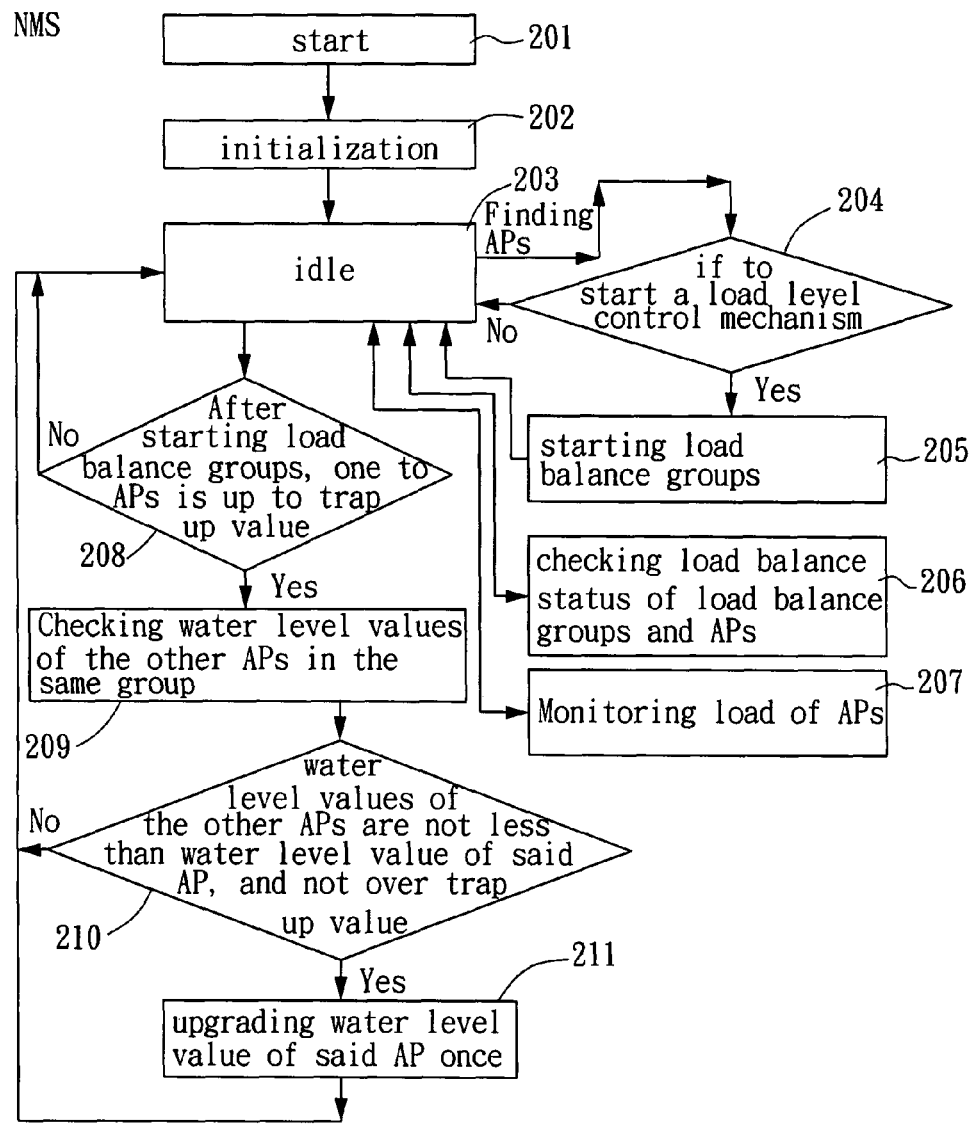
FIG. 2 is a flowchart of a method using a Network Management Server (NMS) for providing load balance to the wireless network system according to the preferred embodiment of the present invention.

Referring now to FIG. 2, a flowchart of a method using the NMS 11 for providing load balance to the wireless network system 10 according to the preferred embodiment of the present invention is illustrated. As shown, the operation of the NMS 11 comprises the following steps:

In step 201 of start, turning on a power of the NMS 11;

In step 202 of initialization, executing an initialization procedure of the NMS 11, and starting the method for providing load balance of the present invention according to at least one predetermined parameter. It should be noted that the method for providing load balance of the present invention is executed according to a concept of a load level table for controlling an acceptable load in operation of each of the access points.

Referring to FIG. 3, a load level table of the method for providing load balance to the wireless network system according to the preferred embodiment of the present invention showing load levels stored in each of Access Points (APs) is illustrated. As shown, the load level table provides a plurality of conditions, such as water level values, up limit values, trap up values, and low limit values, in which each of the trap up values is a relevant intermediate value between the corresponding up limit value and the corresponding low limit value at the same water level (load level). Preferably, as shown in FIG. 3, the trap up value is 5 less than the corresponding up limit value, and is 15 more than the corresponding low limit value. The conditions of the water level values represents water level values of the access points, while the conditions of the up limit values, the trap up values, and the low limit values corresponding to the water level values respectively represent the up limit values, trap up values, and low limit values of an acceptable load of each of the access points. In the preferred embodiment of the present invention, the load including the acceptable load and a real-time load described hereinafter can be selectively corresponding to one of the amount of the terminal devices linked by the access points and the data flow transmitted by the access points. For instance, referring to the load level table of FIG. 3, the higher the water level value is, the higher the up limit value, the trap up value, and the low limit value of the acceptable load of the access point will be, i.e. it means that the access point can provide a higher acceptable load. In the preferred embodiment of the present invention, the low limit value of each of the water level values is between the trap up value and the low limit value of another one of the water level values inferior to said water level value. For example, the low limit value of the water level values of the level 2 is between the trap up value and the low limit value of the water level value of the level 1. Furthermore, the up limit value of each of the water level values is between the trap up value and the low limit value of another one of the water level values superior to said water level value. For example, the up limit value of the water level values of the level 2 is between the trap up value and the low limit value of the water level value of the level 3. Therefore, when the real-time load of one of the access points (i.e. a transient load in operation) reaches the up limit value (or the low limit value) of the water level value at present so as to be upgraded to a higher water level value (or downgraded to a lower water level value), the real-time load of the access point will be between the trap up value and the low limit value of the higher water level value (or the lower water level value).

In step 203 of idle, after finished the initialization procedure, the NMS will be in an idle status;

In step 204, if any access point in the wireless network system is found, checking if a load level control mechanism of the wireless network system is started. If not, the access point will be ignored so as to go back to the idle status of the step 203; if yes, go to step 205;

In step 205, starting a grouping mechanism of load balance groups to group all of found access points into a plurality of groups. After the grouping mechanism is finished, go back to the idle status of the step 203. According to the method for providing load balance of the preferred embodiment of the present invention, all of the access points are grouped into a plurality of groups, and then a load balance control will be executed to control the load of each of the access points in each of the groups so as to efficiently improve the control efficiency and enhance the network transmission efficiency.

In step 206 and step 207, in the preferred embodiment of the present invention, the NMS will be suitably set so as to selectively control the NMS to periodically (for ex., per several minutes) and actively check the load balance status of each of the groups (i.e. the step 206) or the linking status or the real-time load of each of the access points (i.e. the step 207). Moreover, according to a checked result, the water level value of the acceptable load of one of the access points will be controlled and adjusted, or the group allocation of one of the access points will be changed, so as to improve the load balance status thereof for enhancing the overall efficiency of the wireless network system.

In step 208, if the load level control mechanism is started and the NMS receives a warning signal transmitted from one of the access points, it means that the real-time load of said access point has been up to (or not less than) the trap up value of the water level value at present so as to go to step 209; if not, go back to the idle status of the step 203;

In step 209, checking the water level values of the other access points belonged to the same group of said access point sending the warning signal via the NMS;

In step 210, comparing the water level values. If all of the water level values of the other access points belonged to the same group of said access point are not less than the water level value of said access point sending the warning signal (i.e. the water level value of said access point sending the warning signal is relative less than that of the other access points belonged to the same group) and all of the real-time load of the other access points is normal (i.e. not over the trap up value), go to step 211; if not, go back to the idle status of the step 203; and In step 211, transmitting a control signal to said access point sending the warning signal, and upgrading the water level value thereof once, so that the real-time load thereof will be between the trap up value and the low limit value of one upgraded water level value to stop sending the warning signal. In other words, said access point is allowed to keep a higher acceptable load. Only when the real-time load of the access point of the present invention is up to the trap up value, the access point actively sends a signal of the corresponding load status (i.e. the water level value) thereof to the NMS; and only when the NMS receives the signal representing that the load status of said access point is up to the trap up value, the NMS monitors the load status (i.e. the water level value) of the other access points, so that it is unnecessary for each of the access points to continuously broadcast its corresponding load status so as to prevent from occupying the bandwidth thereof and thus to improve the overall efficiency of the wireless network system.

Figure 4:
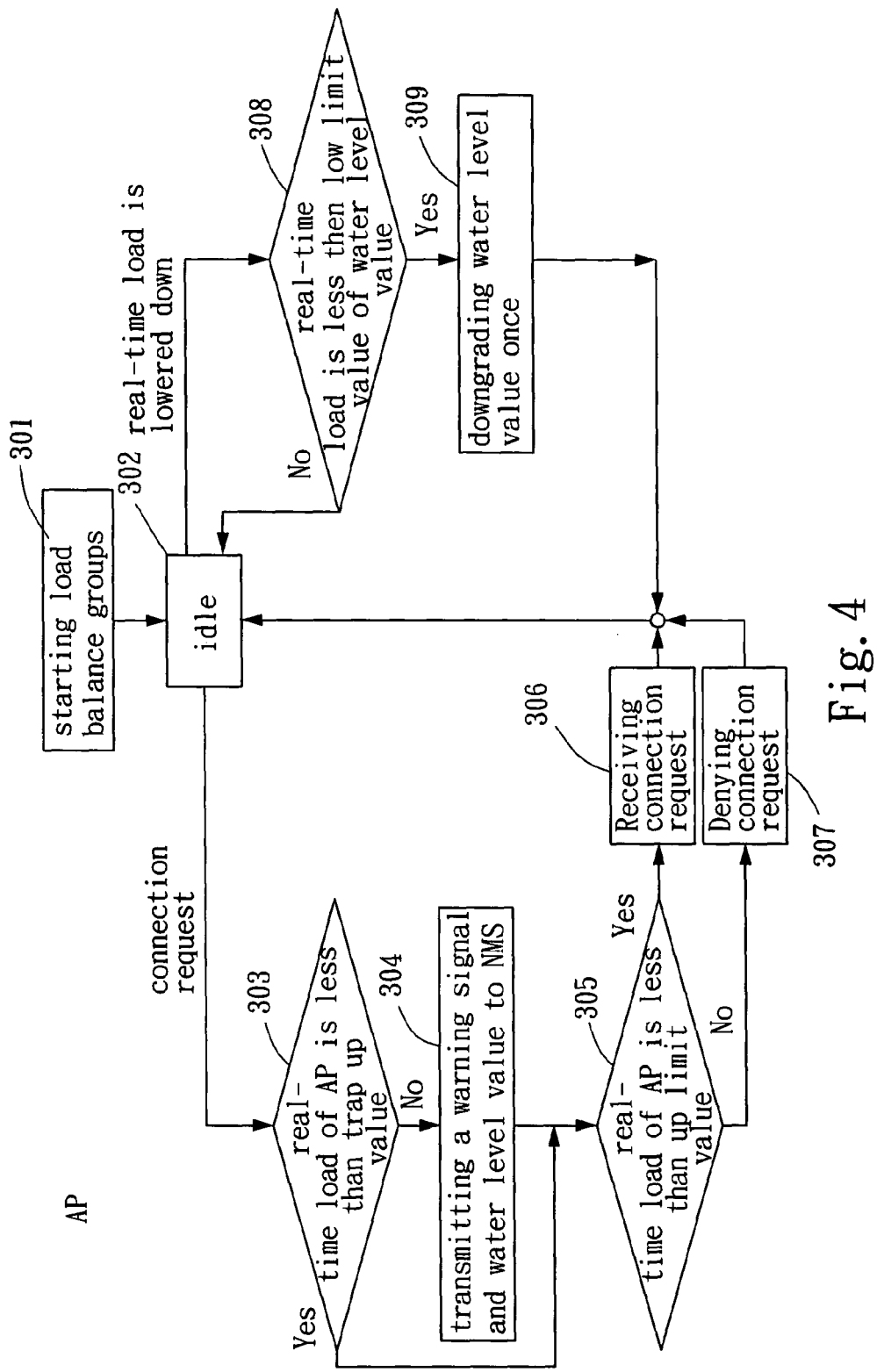
FIG. 4 is a flowchart of the method for providing load balance to the wireless network system according to the preferred embodiment of the present invention when the APs are in use.
Figure 5:
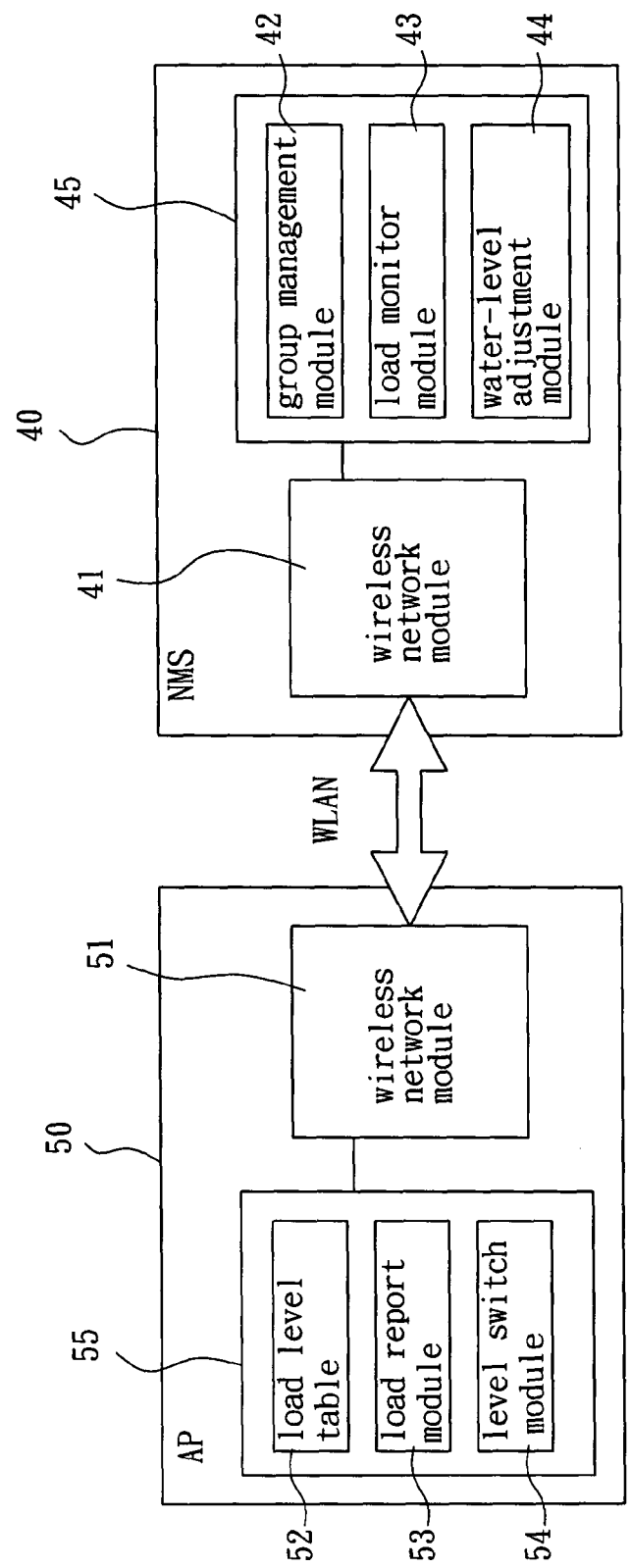
FIG. 5 is a block diagram of the NMS and one of the APs of the wireless network system according to the preferred embodiment of the present invention.

Referring to FIG. 4, a flowchart of the method for providing load balance to the wireless network system when the access points are in use according to the preferred embodiment of the present invention is illustrated. As shown, the operation of each one of the access points comprises the following steps:

In step 301, executing an initialization procedure of the access point, and starting a load balance function for the corresponding group, while the access point tries to report an existence status thereof to the other access points and the NMS;

In step 302, switching into an idle status;

In step 303, when receiving a connection request of a terminal device (or an information transmission request thereof), checking if the real-time load of the access point is less than the trap up value of the water level value of the access point at present. If yes, go to step 305; if not, go to step 304;

In step 304, transmitting a warning signal and the water level value at present to the NMS by the access point;

In step 305, checking if the real-time load of the access point is less than the up limit value corresponding to the water level value at present. If yes, go to step 306; if not, go to step 307;

In step 306, accepting the connecting request of the terminal device (or the information transmission request thereof). And then, go back to the idle status of the step 302;

In step 307, denying the connecting request of the terminal device (or the information transmission request thereof). And then, go back to the idle status of the step 302;

In step 308, when the real-time load of the access point is lowered down, checking if the real-time load of the access point is less than the low limit value corresponding to the water level value at present. If yes, go to step 309; if not, go to the idle status of the step 302;

In step 309, downgrading the water level value of the access point to a lower water level value once so as to lower down the acceptable load of the access point;

Referring now to FIG. 5, a block diagram of a Network Management Server (NMS) 40 and one of the Access Points (APs) 50 of the wireless network system according to the preferred embodiment of the present invention is illustrated. As shown, the NMS 40 further comprises a wireless network module 41, a group management module 42, a load monitor module 43, and a water-level adjustment module 44. In the preferred embodiment of the present invention; the group management module 42, the load monitor module 43, and the water-level adjustment module 44 may be in a software form selectively stored in (but not limited to): a Non-Volatile Memory (NVM) 45, such as a hard disk, a flash memory, or a Programmable Read-Only Memory (PROM). The wireless network module 41 provides a function for the NMS 40 to link to a wireless network, such as a Wireless Local Access Network (WLAN), and then connect to each of the access points 50 in the wireless network via the wireless network module 41. Due to the wireless network module 41 can be optionally varied by the person skilled in the art based on related traditional technologies applied to traditional wireless network devices without departing from the scope and the spirit of the present invention, the detailed description thereof will be omitted hereinafter. The group management module 42 is used to group the access points 50 into one or one more groups via the wireless network. The load monitor module 43 is used to monitor the real-time load and the water level value of each of the access points 50 via the wireless network, and then compare each of the water level values to determine the load balance status of each of the groups. The water-level adjustment module 44 is used to determine if a water-level adjustment signal is outputted to adjust and upgrade the corresponding water level value of one of the access points 50 in the same group according to the real-time load of each of the access points 50 in the same group monitored by the load monitor module 43 and a comparison result of the water level values compared by the load monitor module 43.

Referring still to FIG. 5, each of the access points 50 further comprises a wireless network module 51, a load level table 52, a load report module 53, and a level switch module 54. The wireless network module 51 provides a function for the access point 50 to connect to the NMS 40, the terminal device, and the other access points 50 via the wireless network. Due to the wireless network module 51 can be optionally varied by the person skilled in the art based on related traditional technologies applied to traditional wireless network devices without departing from the scope and the spirit of the present invention, the detailed description thereof will be omitted hereinafter. In the preferred embodiment of the present invention, the load level table 52, the load report module 53, and the level switch module 54 may be in a software form selectively stored in (but not limited to): a Non-Volatile Memory (NVM) 55, such as a hard disk, a flash memory, or a Programmable Read-Only Memory (PROM). As shown in FIG. 3, the load level table 52 includes a plurality of water level values which are graded according to the acceptable load of the access points 50, and each of the water level values has a plurality of corresponding conditions, such as an up limit value, a trap up value, and a low limit value, each of which is recorded with a value of its corresponding acceptable load. The load report module 53 is used to transmit the water level value corresponding to the acceptable load of the access points 50 and the real-time load of the access points 50 to the NMS 40 via the wireless network, especially when the real-time load thereof is up to the trap up value. The level switch module 54 is used to receive the water-level adjustment signal from the NMS 40, and switch (upgrade) the corresponding water level value according to the water-level adjustment signal. Alternatively, when the real-time load is less than the low limit value, the level switch module 54 is used to downgrade the corresponding water level value.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for providing load balance to a wireless network system provided with at least one terminal device, a plurality of access points, and a network management server (NMS), the method comprising:

employing the NMS to group the access points into at least one group by the NMS, the access points being pre-set individually by respective water level values corresponding to respective acceptable loads of the access points, wherein the water level values are pre-set individually with corresponding up limit values, trap up values and low limit values; each of the trap up values is a relevant intermediate value between the corresponding up limit value and the corresponding low limit value at the same water level; posing the NMS at an idle status of communication and waiting for a warning signal of a load status from any of the access points; only when a real-time load of one of the access points is not less than the respective trap up value of said one of the access points, said one of the access points sending out said warning signal; upon detecting said warning signal, employing the NMS to check the water level values of the other access points belonged to the same group of said one of the access points; and when all of the water level values of the other access points belonged to the same group of said one of the access points are not less than the water level value of said one of the access points, said NMS upgrading the water level value of said one of the access points once, so that said one of the access points is allowed to keep a higher acceptable load.

2. The method for providing load balance to the wireless network system of claim 1, wherein, when the real-time load of any one of the access points is not less than the up limit value, said any one of the access points will deny an information transmission request of the terminal device.

3. The method for providing load balance to the wireless network system of claim 2, wherein, when the real-time load of another one of the access points is less than the low limit value, the water level value of said another one of the access points will be downgraded once.

4. The method for providing load balance to the wireless network system of claim 3, wherein the low limit value of each of the water level values is between the trap up value and the low limit value of another one of the water level values inferior to said each of the water level values, and the up limit value of each of the water level values is between the trap up value and the low limit value of another one of the water level values superior to said each of the water level values.

5. The method for providing load balance to the wireless network system of claim 1, wherein the real-time load and the acceptable load are corresponding to either an amount of the terminal devices linked by the access point or an amount of data flow transmitted by the access point.

6. A wireless network system for providing load balance, the wireless network system being provided with at least one terminal device, a plurality of access points, and a network management server (NMS); said terminal device being connected to the access points via a wireless network for transmitting information, the NMS further comprising: a wireless network module for connecting to each of the access points via the wireless network; a group management module for grouping the access points into at least one group via the wireless network; a load monitor module for monitoring a real-time load of each of the access points via the wireless network; and a water-level adjustment module for determining if a water-level adjustment signal is outputted to the access points in the same group according to the real-time load of each of the access points in the same group monitored by the load monitor module and each of the access points further comprising: another wireless network module for connecting to the NMS, the terminal device, and the other access points via the wireless network; a load level table including a plurality of water level values which are graded according to at least one acceptable load, wherein each of the water level values has an up limit value, a trap up value, and a low limit value corresponding to said each of the water level values; wherein, each of the trap up values is a relevant intermediate value between the corresponding up limit value and the corresponding low limit value at the same water level; a load report module for transmitting the water level value corresponding to the acceptable load of the access point and the real-time load of the access point to the NMS via the wireless network; and a level switch module for receiving the water-level adjustment signal from the NMS, and switching the corresponding water level value according to the water-level adjustment signal; wherein, only when the real-time load of any one of the access points is not less than the trap up value of said access point, said load report module transmitting said water level value corresponding to the acceptable load of the access point to the NMS; in addition, upon receiving said water level value, said load monitor module of the NMS checking the water level values of the other access points belonged to the same group of said access point; wherein, when all of the water level values of the other access points belonged to the same group of said access point are not less than the water level value of said access point, the water-level adjustment module outputs one of the water-level adjustment signal for upgrading the water level value to said access point, so that the water level value of said access point is upgraded once and said access point is allowed to keep a higher acceptable load.

7. The wireless network system for providing load balance of claim 6, wherein,
when the real-time load of any one of the access points is not less than the up limit value, said any one of the access points will deny an information transmission request of the terminal device;
when the real-time load of any one of the access points is less than the low limit value, the water level value of said any one of the access points will be downgraded once.

8. The wireless network system for providing load balance of claim 7, wherein the low limit value of each of the water level values is between the trap up value and the low limit value of another one of the water level values inferior to said each of the water level values, and the up limit value of each of the water level values is between the trap up value and the low limit value of another one of the water level values superior to said each of the water level values.

9. The wireless network system for providing load balance of claim 6, wherein the real-time load and the acceptable load are corresponding to either an amount of the terminal devices linked by the access point or an amount of data flow transmitted by the access point.

10. A method for providing load balance to a wireless network system provided with at least one terminal device, a plurality of access points (APs) classified into a plurality of groups, and a network management server (NMS), comprising:
(1) assigning each of the APs to have a respective water level value that includes an up limit value, a low limit value smaller than the up limit value, and a trap up value between the up limit value and the low limit value;
(2) posing the APs at an idle status of communication;
(3) posing the NMS at another idle status of communication;
(4) if a real-time load of one of the APs is up to the trap up value, activating said one of the APs to send a warning signal of a load status to the NMS;
(5) only when the NMS detects the warning signal, the NMS being activated to detect the other APs in the same group of said one of the APs;
(6) if all of the water level values of said other APs are not less than the water level value of said one of the APs, the NMS upgrading the water level value of said one of the APs once, so that said one of the APs is allowed to keep a higher acceptable load; and
(7) posing the NMS and all the APs back to the corresponding idle statuses of communication.

11. The method according to claim 10, wherein the low limit value of each of the water level values is between the corresponding trap up value and the low limit value of another one of the water level values inferior to said each of the water level values, and the up limit value of each of the water level values is between the trap up value and the low limit value of another one of the water level values superior to said each of the water level values.

* * * * *